Figure 1:
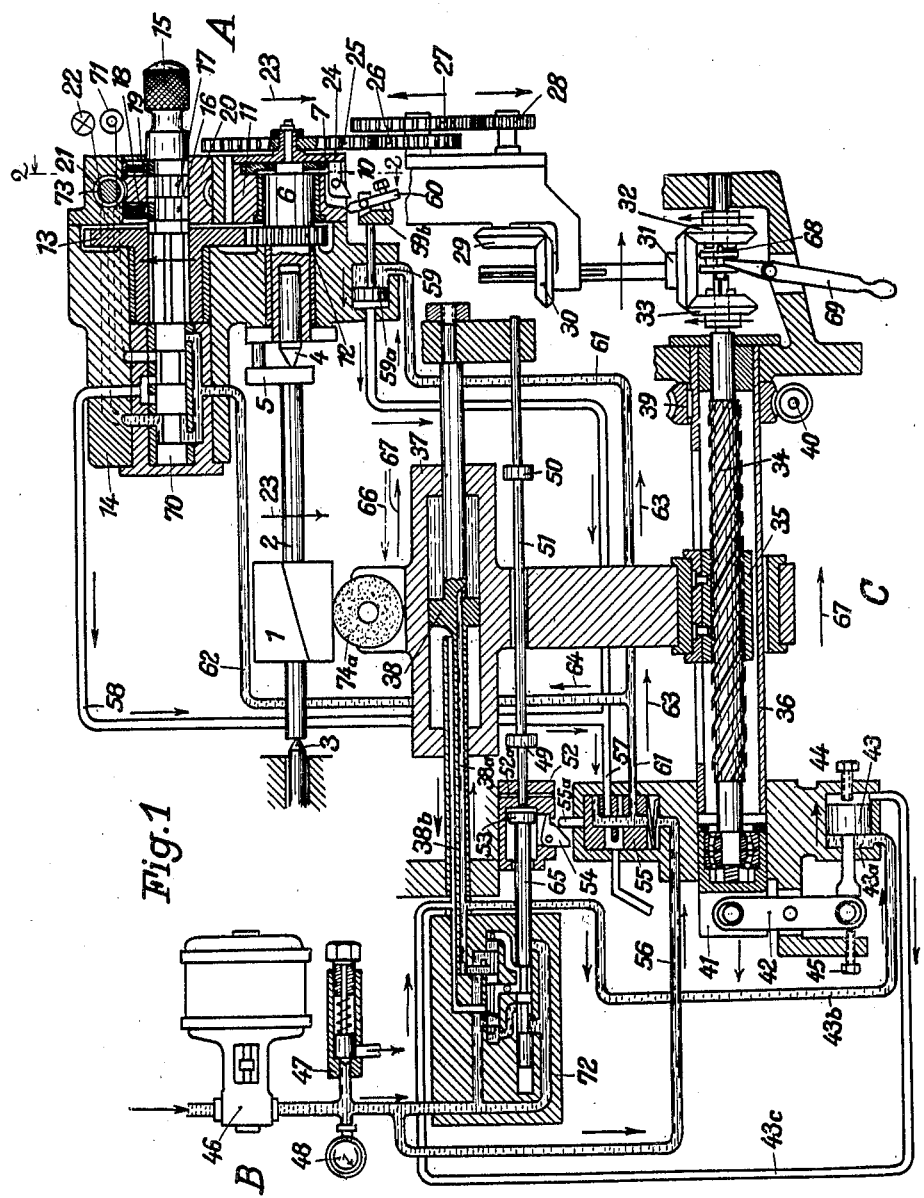

July 10, 1934.   H. SCHICHT   1,966,314
AUTOMATIC INDEXING DEVICE
Filed Nov. 21, 1932   2 Sheets-Sheet 1

Inventor:
Heinrich Schicht
By [signature]
Attorneys

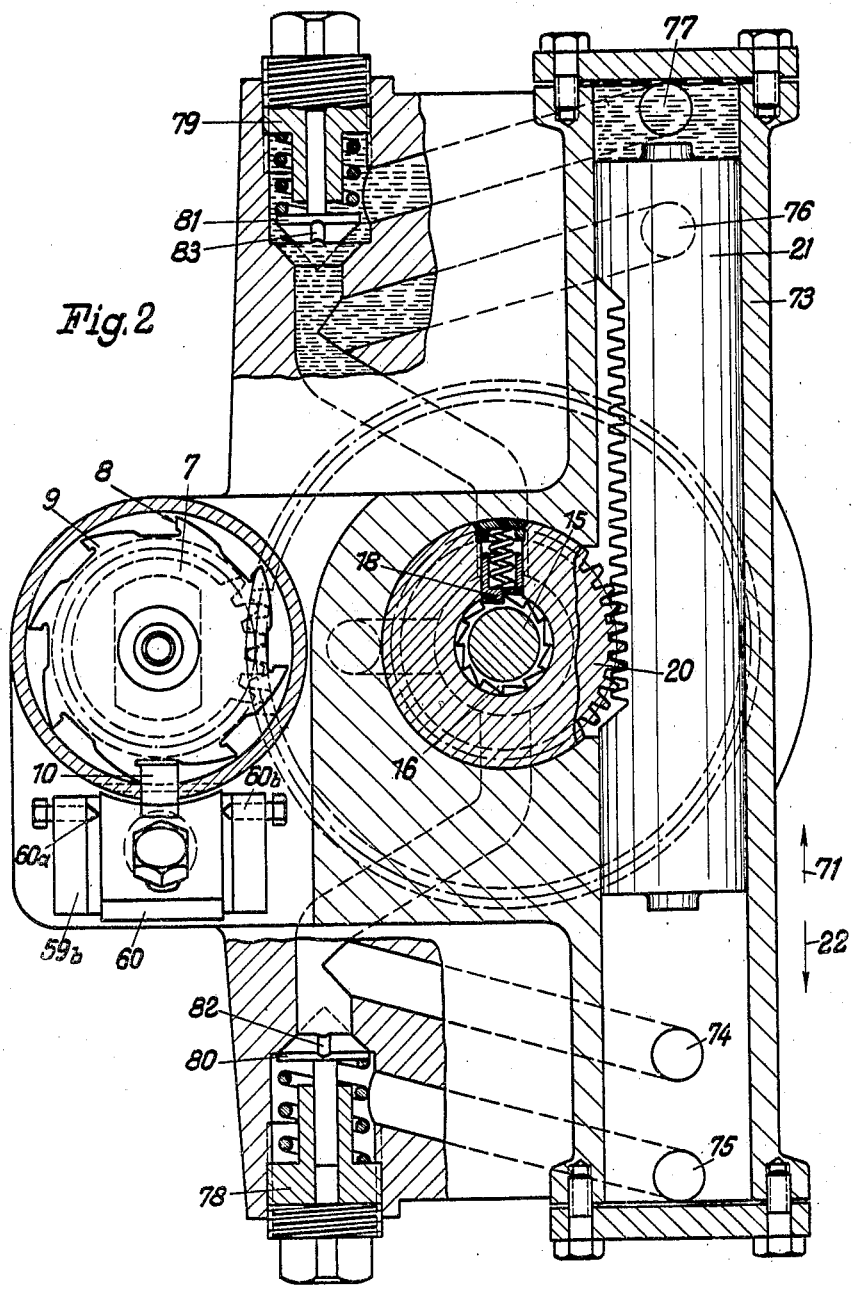

Patented July 10, 1934

1,966,314

UNITED STATES PATENT OFFICE 1,966,314

AUTOMATIC INDEXING DEVICE

Heinrich Schicht, Huckeswagen, Germany, assignor to the firm W. Ferd. Klingelnberg Sohne, Remscheid-Berghausen, Germany Application November 21, 1932, Serial No. 643,709
In Germany December 5, 1931

8 Claims. (Cl. 51—225)

The invention relates to an automatic, hydraulically-actuated indexing device to be used for indexing straight or spiral-fluted cutters, such as gear hobs, face milling cutters, splined shaft cutters, etc. The principle of the inventive idea is based on the utilization of the uniformity and power of hydraulic pressure to eliminate imperfections in mechanical indexing devices, such as inevitable sources of errors in the mechanical gear transmission, inaccuracies increasing with wear, and therefore increasing play or backlash of the indexing mechanism, inadequate wedge-shaped indexing notches in conjunction with too stiff or too weak springs which have an adverse effect on the dependability of indexing, etc.

The device is so designed that wear of the mechanism does not affect either accuracy or positiveness of indexing, and that, because of the direct connection between the index plate and work axis. As a result of the saw-tooth-shaped teeth of the index plate, each of the teeth presenting one single contacting or locking surface in one direction only, a very high indexing accuracy may be obtained and also permanently maintained by reason of the non-wearing property of the pressure oil circuit.

The device is adapted to be incorporated in machines and apparatus of every description in which accuracy of automatic indexing is of great importance, as, for example, in milling machines, cutter and splined shaft grinders, and similar machines.

In the description following, an indexing device will be explained by way of example as employed in combination with a cutter grinding machine.

In the accompanying drawings:

Figure 1 shows one form of the indexing device with the complete outfit, including oil pump and control members, the indexing device proper being designated A, the oil pump B, and the slide for actuating the various oil control members C; and Fig. 2 is a section taken through the indexing device on line 2—2 of Fig. 1.

Essentially, the indexing device acts on the principle that the one-sided, straight flat contacting or locking surface of the saw-tooth shaped locking notches of the index plate mounted directly on the work spindle is tightly forced against the flat surface of an index pawl under the pressure of an oil circuit. During the working operation, this pawl is caused to act on a piston in one direction only, a very high accuracy being obtainable in making the index plate due to the simplicity of the one-sided contact or locking surfaces, while the uniformity with which the latter are held in contact insures an absolute absence of play or backlash.

Cooperation of the various component parts of the indexing device A (Fig. 1) will now be explained in detail, the device shown presenting merely one example in a variety of possible types.

The work 1 (see Fig. 1) to be indexed is mounted on an arbour 2 held between the centers 3 and 4 and driven from the shaft 6 (which carries the index plate) through the dog driver 5. The index plate 7 is mounted on spindle 6 and securely locked to it. Under the hydraulic pressure which acts at all times in the same direction on the working piston 21, the indexing pawl 10 is forced against the one-sided contacting surface 8 (see Fig. 2) of the saw-tooth shaped teeth 9 of the index plate or ratchet wheel 7, said indexing pawl being pivoted in the drum 11 and held in contact with the ratchet wheel tooth under spring pressure.

The force exerted by oil pressure on the piston 21 is imparted to the work spindle 6 and therefore to the index plate 7 by a train of members, as will be seen from the following explanation.

The piston 21 has rack teeth cut on its periphery and meshing with the worm gear 20, the latter housing two pawls 18 and 19 which are in alternate engagement with the ratchet wheels 16 and 17, respectively. One of said pawls serves to transmit the drive in a clockwise direction; while the other pawl drives in an anticlockwise direction. The shaft 15 may be axially adjusted so that engagement may be made either between the pawl 18 and the ratchet wheel 16, or between the pawl 19 and the ratchet wheel 17. Rotation of the worm gear 20 is transmitted by the pawls, spur gears 13 and 12 to the spindle 6 carrying the index ratchet wheel and work.

Indexing of the work is accomplished by the pressure of the oil circuit acting on the piston 21 in combination with the interposed train of power transmission members, as mentioned heretofore.

Control of the pressure oil for work indexing is made in the following manner:

At each end of its stroke, the working cylinder 37 reciprocating together with the nut 35 which engages with the lead screw 34, is caused to run against the collars 49 or 50, thus imparting a forward and backward motion to the control piston rod 51. To the latter is secured a sleeve 52 by means of the pin 52a. The sleeve surrounds a collar 53 and also receives a pawl which, while moving in one direction, depresses the pin 55a of the control piston 55 for a very short period of time and releases the same instantly, so that it will be forced back into its initial position under the combined action of spring and oil pressures. During the short period the piston 55 is forced downwards, the flow of the oil supplied through the oil pipe 56 in the direction of the arrow shown will be reversed for a short while, so that the oil is caused to be admitted to the cylinders 59 and 73 in a reversed direction through the pipes 57 and 58, respectively. The piston 59a moving within the cylinder 59 advances the pawl lever 60 (Fig. 2) suspended from the centers 60a and 60b of the fork 59b at the end of the piston 59a, while the oil branch supplied through the pipe 58 causes the rack-toothed piston 21 to be advanced towards its end of stroke so that the pawl 18 engages its respective ratchet wheel intermittently. So to speak, the piston is pulled up or wound up. As soon as the pawl 54 has been moved back over the pin 55a of the control piston 55, the latter rises again quickly, and the direction of oil circulation is again reversed to conform with the direction of the arrows 63 and 64, respectively, the oil branches being fed to the cylinders 59 and 73 through the pipes 61 and 62, respectively. These are shown filled up with pressure oil in the drawings.

The piston in the cylinder 59 together with the pawl 60 then moves back towards the left. On the return stroke, the pawl 60 pulls the locking pawl 10 out of engagement with the tooth of the index ratchet wheel, engagement being, however, instantly reestablished between the pawl 10 and the next tooth of the index plate. Meanwhile, pressure oil has been admitted to the piston 21 from its opposite end, and the movement of the piston has been transmitted by worm gear 20 and spur gears 12, 13 to the work spindle which is thus indexed by one division of the index plate 7. While indexing is proceeding, the locking pawl 10 slides down the inclined back of the ratchet wheel tooth until it contacts again with the straight locking surface of the next tooth.

The invention includes the provision of means to eliminate shocks during indexing operations, as well as to insure an easy disengagement of the pawl 10. An oil throttling device is incorporated for this purpose at each end of the cylinder 73. The device acts in such a way that the piston 21 is prevented from running against the heads of the cylinder 73, so that no rise will be given to any elastic stretches taking place between the cylinder wall and index ratchet wheel by the way of the connecting train of machine members. In principle, the oil throttling device may be arranged as described below.

Port openings 74, 75, and 76, 77, respectively, (Fig. 2) are provided at each end of the cylinder walls 73, the openings 74 and 76 being cut at a distance from the cylinder heads which is somewhat greater than the distance of the openings 75 and 77. The openings 75 and 77 are connected to channels leading to the back pressure valves 78 and 79, respectively. These valves are open whenever the oil is admitted to the cylinder; and are closed whenever the oil is discharged from it. Small grooves 82 and 83 are cut in the cones 80 and 81, respectively, of the valves, the grooves presenting only a very small passage for the oil, when the cones are forced against their respective seats.

The oil throttling device acts as follows: On its pulling up or winding up stroke, the piston 21 is rapidly advanced until, for example, reaching the opening 76 which allows of a quick discharge of the oil. When the piston continues to approach the end position of its stroke, it covers the opening 76, and the back-pressure valve 79 is closed, thus restricting the flow of oil which is throttled down through the narrow groove 83.

As a result of the throttling resistance, the movement of the piston is slowed down to such an extent that, during the short period of time the oil is flowing in the direction of the arrow 71, the piston cannot move close to the end of the cylinder, but it will stay at a certain distance from the same when reversing of the oil flow is taking place. By throttling the oil in the described manner, the piston will be positively prevented from being forced against the cylinder heads under the action of the lead screw rotation. The result is that distortion between the pawl 10 and index plate 7 is prevented. Without applying the throttling device, such distortion would arise, whenever the rotary movement derived from the lead screw rotation tends to further force the piston 21 against the cylinder head, after it has been pulled up or wound up into its initial position. Since, however, the throttling device prevents the piston from moving close to the cylinder head, some length of travel will be still available to allow the piston to follow the rotation of the lead screw without striking the cylinder head.

Apart from the indexing movement, two additional movements are taking place, viz., for each indexed position the rotation of the work 1 following the lead of the spiral angle (i. e., for a milling cutter: the helix of the spiral flutes), and the reciprocation of a tool 74a (i. e., for a cutter grinder: the grinding wheel). These movements, too, are produced by hydraulic means in combination with mechanical driving members. It is of importance, that, according to the inventive idea, the two movements are made positively interdependent and, in addition, positively dependent on the indexing movement of the work.

For each indexed position the rotation of the work 1 in conformity with the lead of spiral is derived in the following manner:

By means of the movable working cylinder 37 and the stationary piston 38, the nut 35 is hydraulically moved forth and back along the lead screw 34, the rotation of the nut being prevented through the tube 36 by means of a tongue and groove. The longitudinal movement of the nut results in a rotation of the lead screw about its axis, this rotation being transmitted to the spindle 6 and work 1 by the bevel gears 29 to 33, change gears 25 to 28, drum 11, pawl 10 and index plate 7.

It will, of course, be possible to produce rotation of the lead screw by any other suitable means as a substitute for the axial movement of the nut 35 along the lead screw. For example, this might be accomplished by rotating the nut by means of a worm gear drive 39, 40. Such a rotation of the nut and, therefore, of the lead screw is transmitted to the work 1 in the same way as before and by the same change gears and other transmission members. This kind of rotation will be indispensable, e. g., in the case of a cutter grinding machine, when the indexing device is to be used for adjusting the work for the depth of cut.

In the event that the desired lead of spiral of the work 1 conforms with that of the lead screw, the change gears must have a ratio of 1 to 1.

When the lead is larger or smaller, the ratio of the change gears must be selected accordingly.

A feature of the indexing device consists in the fact that the oil circuit causing work indexing is positively interconnected with the oil circuit which produces the reciprocation of the tool 74a. The result is that the longitudinal movement of the tool 74a (grinding wheel) cannot be reversed until after the completion of the indexing movement. The interdependency of the longitudinal and indexing movements constitutes a dependable safeguard against faulty work indexings. The details of this will be evident from the following explanations:

While indexing is proceeding, the working cylinder 37 together with the nut 35 and tool 74a is caused to stop for a moment, because the oil pressure which produces their reciprocation will be suddenly reduced in the case that, as a consequence of the reversal of the valve 55, the oil is fed to the cylinders 73 and 59 to wind up or pull up the pistons 21 and 59a, respectively.

Another feature of the indexing device is the provision of special means for neutralizing torsional effects, stretches, looseness, backlash and the like, which are unavoidable in all such indexing devices, including the device in question, where forces, whether mechanical or hydraulic, are acting upon gears, shafts, etc.

The mentioned torsional effects and stretches existing in the mechanical transmission members, such as gears, shafts, etc., work in such a manner that, while the nut 35 is running on the lead screw in one direction, the index plate 7 with the work piece 1 will not occupy exactly the same position, as when the nut is running in the opposite direction. In other words, the nut may become twisted because of the elasticity of the mechanical components of the device. This change of relative work position might have a very detrimental effect in that the work, while the tool is passing in one direction, would be caused to occupy another position relative to the tool than that while the tool is moving in the opposite direction.

According to the invention, this undesirable effect of twisting the work will be neutralized by means of a special device described hereafter. The action of the device consists in shifting the lead screw 34 by hydraulic means in the direction of its axis. This axial displacement of the lead screw takes place at the instant of each reversal of the nut 35 and in a direction opposite to that of the nut. Details of the device will be given hereafter.

The lead screw 34 is supported by longitudinal bearings in the bushing 41 which may be axially reciprocated by means of the lever 42 and piston 43, the length of axial stroke being adjustable by the set screws 44 and 45. The piston 43 moves in the cylinder 43a under the pressure of an oil branch derived from the main pressure oil circuit. Through the pipes 43b and 43c, this branch of the pressure oil circuit is directly connected to the pipes 38a and 38b, the main control valve 72 serving for controlling both the mentioned branch circuit and the main circuit actuating the hydraulic reciprocation of the nut.

The pipes 43b and 43c are so connected to the pipes 38a and 38b, as well as to the cylinder 43a, that the direction of the axial displacement of the lead screw 34 will be at all times opposite to that of the movement of the nut 35.

The result of this axial displacement of the lead screw is as follows: Since the nut 35 is prevented from rotation by the tube 36, each axial displacement of the lead screw 34 relative to the nut tends to produce an additional rotation of the lead screw, and this rotation is transmitted to the index plate and work in the same manner as described above. By suitably selecting the direction of the axial displacement of the lead screw, the direction of work rotation will be such that undesirable twisting or torsional effects will be counteracted or neutralized by turning the work piece into its correct position.

The work piece 1 shown in Fig. 1, has left-hand spiral flutes, the control mechanism being adjusted accordingly. With a work having right-hand spiral flutes, it will be necessary to rotate the work in a reversed direction opposite to that of the arrow 23, although the nut 35 is moved along the lead screw in the direction of the arrow 67. To avoid changing gears, a clutch 68 operated by the hand lever 69 has been provided, the drive being taken from the lead screw in either direction by one of the bevel gears 32 or 33 of the clutch.

Since, in this case, the direction of the pressure oil acting on the piston 21 as well as the direction of the ratchet mechanisms 16 and 17 must be also reversed, the piston 15 having been made axially adjustable by hand. By pulling the piston 15 outwards, the ratchet wheel 16 will be made inactive and the ratchet wheel 17 will be engaged with the ratchet pawl 19, while the pawl 18 is caused to enter a recess of the piston simultaneously. The control piston 70 is so adjusted that the oil flow is reversed in a direction corresponding to that of the point of the arrow 71. Hence, the direction of work rotation is reversed by the aid of the transmitting members 20, 15, 13, 12 6, 5 and 2.

Although only one form of index plate 7 has been shown in the drawings, it is clear that different styles of indexing plates may be employed in accordance with the type of work which is being treated in the machine. It will be clear that the apparatus described above will produce positive smooth indexing without back-lash or lost motion, so that machines employing it may produce accurate work with no possibility of errors due to failure of the indexing mechanism.

What is claimed is:

1. In grinding apparatus including an automatic indexing device for straight or spiral fluted work, a work spindle having an index plate directly connected to it; means for locking said index plate in each of its positions; a cutting tool for cooperation with the work; means for rotating the work spindle according to the spiral flute of the work; said means including a lead screw and a nut for rotating the said lead screw by moving the nut along the lead screw; hydraulic means for displacing said lead screw in an axial direction; and means controlled by movement of the cutting tool for hydraulically unlocking said index plate and indexing it.

2. An automatic indexing device for straight- and spiral-fluted work comprising a work spindle; an index plate directly connected with said work spindle, said index plate having flutes like saw teeth; a rotatable drum for housing said index plate; a movable dog in said drum for locking said index plate relative to said drum; means for moving a cutting tool with respect to the work spindle; means for rotating said drum and index plate in a predetermined ratio to the velocity of the movement of the tool with respect to the work; hydraulic means to compensate for looseness in the mechanical parts; and hydraulic means controlled by said movement of the cutting tool for momentarily unlocking said index plate, adjusting said index plate during the interval that it is unlocked, and actuating said means for compensation of looseness to cause the tool to cut in both directions of the movement along the work.

3. An automatic indexing device for straight- and spiral-fluted work comprising a work spindle; an index plate directly connected with said work spindle, said index plate having flutes like saw teeth; a rotatable drum for housing said index plate; an hydraulic piston formed as a rack; a gear in mesh with the rack on said piston; spur gear means for connecting said rack gear with said work spindle; and means for connecting said spur gear means with said rack gear for taking cuts in either direction of rotation of the work spindle as necessary for left hand and right hand spiral fluted work.

4. An automatic indexing device for straight- and spiral-fluted work comprising a work spindle; an index plate directly connected with said work spindle; a rotatable drum for housing said index plate; hydraulic means for continuously pressing said index plate and drum in the same direction of rotation; means for locking said index plate in each of its adjusted positions relative to said drum, said locking means being mounted in said drum; means for rotating said drum and index plate in a certain ratio to the velocity of the movement of the tool along the work spindle; and means for compensating for looseness in the mechanical means to make the tool cut in both directions of movement along the work spindle.

5. An automatic indexing device for straight- and spiral-fluted work comprising a work spindle; an index plate directly connected with said work spindle; a rotatable drum for housing said index plate; hydraulic means for continuously pressing said index plate and said drum in the same direction of rotation; hydraulic means directly connected with the first said hydraulic means for engaging and disengaging the locking means in the drum; and hydraulic means directly connected with the said first and second hydraulic means to compensate for looseness so as to make the tool cut in both directions of movement along the work spindle.

6. An automatic indexing device for straight- and spiral-fluted work comprising a work spindle; an index plate directly connected with said work spindle, said index plate being notched; a rotatable drum enclosing said index plate; means for locking said index plate in each of its positions, said means being mounted in said rotatable drum; a cutting tool for cooperating with the work spindle; means for rotating said drum and work spindle according to the spiral flute of the work, said last mentioned means including a lead screw and a nut for rotating said lead screw by moving the nut along the lead screw; and means for rotating said lead screw manually for adjusting the work spindle toward the cutting tool by rotating the work spindle.

7. An automatic indexing device for straight- and spiral-fluted work comprising a work spindle; an index plate directly connected with said work spindle, said index plate having flutes like saw teeth; a rotatable drum enclosing said index plate; hydraulic means for producing continuous power to rotate said index plate together with said drum; means for stopping said rotation to compensate for backlash during the tool reciprocation, by pressures acting one against the other; means for rotating said drum with the said index plate in a certain ratio to the tool velocity along the work spindle; and means for compensating for backlash of gears in reversing the direction of rotation.

8. An automatic indexing device for straight- and spiral-fluted work comprising a work spindle; an index plate directly connected with said work spindle, said index plate having flutes like saw teeth; a rotatable drum for housing said index plate; means for producing continuous power to rotate said index plate together with said drum, said means including a cylinder and an hydraulic piston movable therein and formed as a rack; a gear train connecting said rack to said index plate; and means in said cylinder for damping the movement of the piston as it approaches an end wall of the cylinder.

HEINRICH SCHICHT.